July 4, 1950 A. G. COOLEY 2,513,402

TELEFACSIMILE COMMUNICATION

Filed April 26, 1945 3 Sheets-Sheet 1

INVENTOR.
A. G. COOLEY
BY E. R. Evans
his attorney

July 4, 1950 A. G. COOLEY 2,513,402

TELEFACSIMILE COMMUNICATION

Filed April 26, 1945 3 Sheets-Sheet 2

INVENTOR.
A. G. COOLEY

BY E. R. Evans
his attorney

TELEFACSIMILE COMMUNICATION

INVENTOR.
A. G. COOLEY
BY E. R. Evans
his attorney

Patented July 4, 1950 2,513,402

UNITED STATES PATENT OFFICE 2,513,402

TELEFACSIMILE COMMUNICATION

Austin G. Cooley, New York, N. Y., assignor to Times Facsimile Corporation, New York, N. Y., a corporation of New York Application April 26, 1945, Serial No. 590,369

10 Claims. (Cl. 178—5.1)

This invention relates to systems and apparatus for the secret transmission of pictures, including facsimiles of written or typed messages and maps.

In ordinary facsimile telegraph systems, transmission of the copy or picture is effected by generating electrical signals corresponding to elemental areas of the scanned copy or picture in the transmitter. In utilizing such signals to reproduce a facsimile copy at the receiving station, the reproduction of the copy or picture at the receiver requires recording of each elemental area with great precision both as to position and density if the recorded copy is to be an accurate facsimile of the original. In order to prevent unauthorized interception of the message or picture, it has been proposed to introduced a predetermined distortion during transmission, which can be corrected at the receiving station, if this station includes means to control the recording mechanism in exactly the same manner as the devices which are employed to distort the signals.

For example, by varying the rate of scanning or the relative movement between the copy and the scanning mechanism of the transmitter, the signals may be distorted and the recording of elemental areas may be displaced from their actual positions if the transmission is received on a convention uniform-rate recording device. This method produces an unintelligible copy or record on a conventional receiver, as explained in my copending application, Ser. No. 474,247, which issued as a patent July 23, 1946, No. 2,404,566, of which the present application is a continuation in part. However, a rapid and relatively large displacement or variation of the scanning rate is required or the recorded message may be decoded or deciphered without great difficulty since almost all pictures, maps and written copy have a recognizable pattern which serves as a key for decoding the message. As the speed and range of the scanning variation are increased, the problem of correcting the signals at the receiver to reproduce a true facsimile of the transmitted copy becomes almost insoluble because of mechanical difficulties. It has been found that a large and rapid variation in the scanning rate introduces the difficulty that the backlash and play in the shafts, gearing and other mechanism of the transmitter and recorder result in objectionable distortion in the copy recorded upon a recorder designed and intended to correct for the distortion, even if the greatest care and precision are used in its construction and operation.

One object of the present invention, therefore is to provide a construction in which the undesired and unavoidoble distortion introduced by employing gearing and other mechanical elements is reduced to a minimum. In this manner, in accordance with the invention, secrecy is obtained by introducing a predetermined variation of a turbulent nature in the scanning of the copy to be transmitted, and the distortion of the signals corrected at the recorder so precisely that a recorded facsimile of excellent quality is obtained.

Another object of the invention is to provide, in a facsimile system of the type having a rotary member for imparting relative movement between a scanning element and the copy and a motor driving said member, electro-optical means for generating an uninterrupted train of variably-spaced or frequency-modulated impulses for controlling the speed of said motor whereby a transmitter and a recorder can be employed for secret transmission by employing identical optical generating means for controlling the motors at the transmitting and receiving stations.

Another object of the invention is to provide an improved arrangement for the secret transmission of intelligence in which the signal distortion means utilized in connection with the transmitter is of such character that the distortion can be accurately corrected at the receiver, the mechanical gearing and connections heretofore proposed being to a great extent eliminated, thus obviating the effects of wear and the inaccurate fitting of parts.

Another object of the invention is to provide, in a picture-transmission system of the character described, improved means for distorting or scrambling the signals at the transmitter and for correcting or decoding the signals with greater precision at the receiver.

A further object of the invention is to improve the construction and characteristics of variable-frequency current generators in general.

A still further object of the invention is to provide, in a system of the character described, an improved signal-distorting mechanism which enables the character of the distortion to be readily changed from time to time, a large number of changes (different codes) being obtainable by simple adjustment and substitution of parts in the distorting mechanism.

Other objects and advantages of the invention will become apparent upon consideration of the embodiments thereof shown in the accompanying drawings, wherein.

Figure 1:
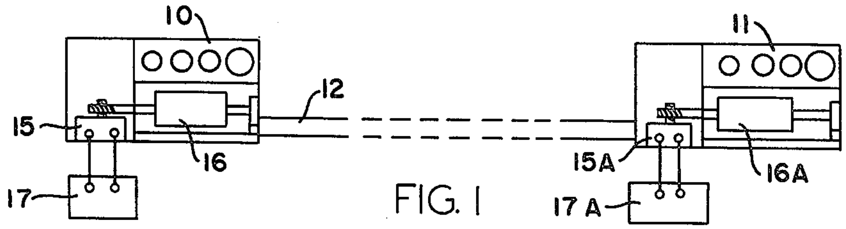
Fig. 1 is a diagrammatic view of a system employing conventional drum-type facsimile apparatus.

Referring to Fig. 1, the facsimile system shown by way of example comprises a drum-type transmitter 10, a drum-type receiver 11 and a connecting wire or radio channel 12 of any suitable type. While the invention will be described in connection with facsimile apparatus of this type for which it is essentially adapted, obviously it may be employed in many systems where trains of signals are distorted in accordance with a prearranged plan or coding for purposes of secrecy or other purposes.

The transmitter 10 and receiver 11 are each provided with a motor 15, 15A connected to turn the associated drum 16, 16A respectively. In order that the drum 16A of the receiver may move in synchronism with the drum 16 of the transmitter, the motors 15 and 15A are exactly controlled in conventional systems to rotate uniformly at precisely the same speed. In accordance with the present invention, the motors 15 and 15A are driven or controlled by variable-frequency impulse generators 17 and 17A, which are identical and which have certain special characteristics as outlined below. Thus the speed of rotation of the drum 16 is varied from time to time so that the scanning rate of the transmitted copy is varied to produce a relatively rapid and wide-range distortion of the signal output. Since the drum 16A of the receiver is maintained in synchronism with the non-uniform rotative movement of the drum 16, the signals may be recorded upon the recording sheet carried by the drum 16A in such a manner that the distortion is practically eliminated and a true facsimile copy made.

In order to obtain satisfactory copies of acceptable quality with the relatively large distortion of the signals required for absolute secrecy, it is necessary to match the characteristics of the generators 17 and 17A with extreme accuracy throughout the entire transmission time and to reduce to a minimum the mechanical gearing and linkages between the control mechanism and the driving motor, and between the rotors of the motors 15 and 15A and the drums 16 and 16A. It is also undesirable to have a cyclic variation in the generator which is repeated at frequent intervals during a single transmission since such repetition renders the decoding of the message, as received on an ordinary recorder, much simpler of accomplishment.

Figure 2:
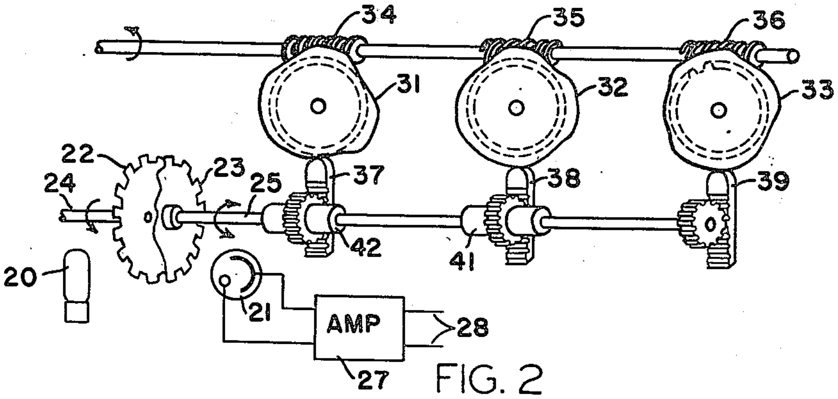
Fig. 2 illustrates a cam controlled optical generator for the transmitter and receiver of Fig. 1.

The arrangement shown in Fig. 2 illustrates one impulse generator for accomplishing the desired result, it being understood that a plurality of impulse generators of identical construction would be employed in a complete system. One would be required for a transmitter and one for each receiver, each generator being like that shown in Fig. 2.

The generator shown in Fig. 2 is of the electro-optical type comprising a light source 20, a photoelectric cell 21 and interposed chopper wheel 22 and aperture plate 23 positioned to modulate the light from the source 20 impinging upon the photocell 21. The chopper wheel 22 is mounted on the rotating shaft 24 and is adapted to rotate at a constant speed. The aperture plate 23 is mounted upon a shaft 25 which is arranged to oscillate first in a clockwise and then in a counter-clockwise direction so that it alternately adds to and subtracts from the frequency of the light beam directed upon the photocell, thus increasing and decreasing the frequency of the impulses in the output circuit of said cell. The result is the same as if the cell 21 and lamp 20 rotated with the shaft 25, and the plate 23 contained a single aperture directly in front of the cell. However, it is more convenient to employ the stationary lamp and cell, by providing a series of apertures in the aperture plate. The variable frequency output of the cell 21 consisting of an uninterrupted train of substantially uniform pulses is amplified in an amplifier 27, the output conductors 28 of which are connected to the driving motor of the facsimile set.

In order to obtain a predetermined complex variation in the impulse frequency which may be accurately controlled although of relatively large magnitude and which may be duplicated in other generators of the same type, a plurality of cams 31, 32 and 33 are provided to control the oscillation of the aperture plate 23. The cams 31, 32 and 33 are driven by any suitable means, such as worms 34, 35 and 36, each engaging a worm wheel (shown in dotted lines) on the shaft of one of the cams. Each worm and worm wheel pair preferably has a different ratio to avoid a frequent repetition of the distortion pattern. The cams are further provided with cam followers or rack members 37, 38 and 39, which are geared to the shaft 25 through differential gearing 41 and 42 whereby the angular movement of the shaft 25 is the resultant of the movements of the three rack members 37, 38 and 39. It will be apparent that two or more impulse generators of this type will have within close tolerances, the same distortion characteristics if the sets of cams in each generator are alike and the gearing is accurately cut and preloaded to obviate backlash. Also it will be noted that the variation pattern of the impulse rate will not be repeated at frequent intervals because of the use of a plurality of cams rotating at different speeds. If desired, new cams having different contours can be substituted from time to time for the cams 31, 32 and 33 so that the scrambling pattern is readily changed.

The motor 15, which is driven by the output of the electro-optical generator, should be a synchronous motor and may be of the phonic wheel type, similar to that disclosed in my prior patent, Pat. No. 2,276,936, granted March 17, 1942. The rotative speed of the rotor of a synchronous motor of this type will follow the variations in the frequency of the applied current. Therefore if the drum of the receiver is started at the same instant as the drum of the transmitter and the impulse generators are started or released at the same instant from corresponding positions, as disclosed in my prior application above referred to, the drums will remain in synchronism although the rotative speeds will vary during transmission so that an unintelligible record will be received by a conventional receiver. Thus the invention provides for secret communication by preventing reception of the messages or pictures sent by the transmitter 10 except at a station having the necessary control or correcting mechanism corresponding to that used with the transmitter 10.

Instead of employing a chopper disc having uniformly spaced teeth or openings, and varying the rotative speed of an aperture plate, a chopper disc having teeth or openings of variable spacing may be used. This construction simplifies the problem of matching the characteristics of the generators at the transmitter and receiver since the cam mechanism is eliminated and the discs are rotated at a uniform speed which may be exactly the same for each generator.

Figure 3:
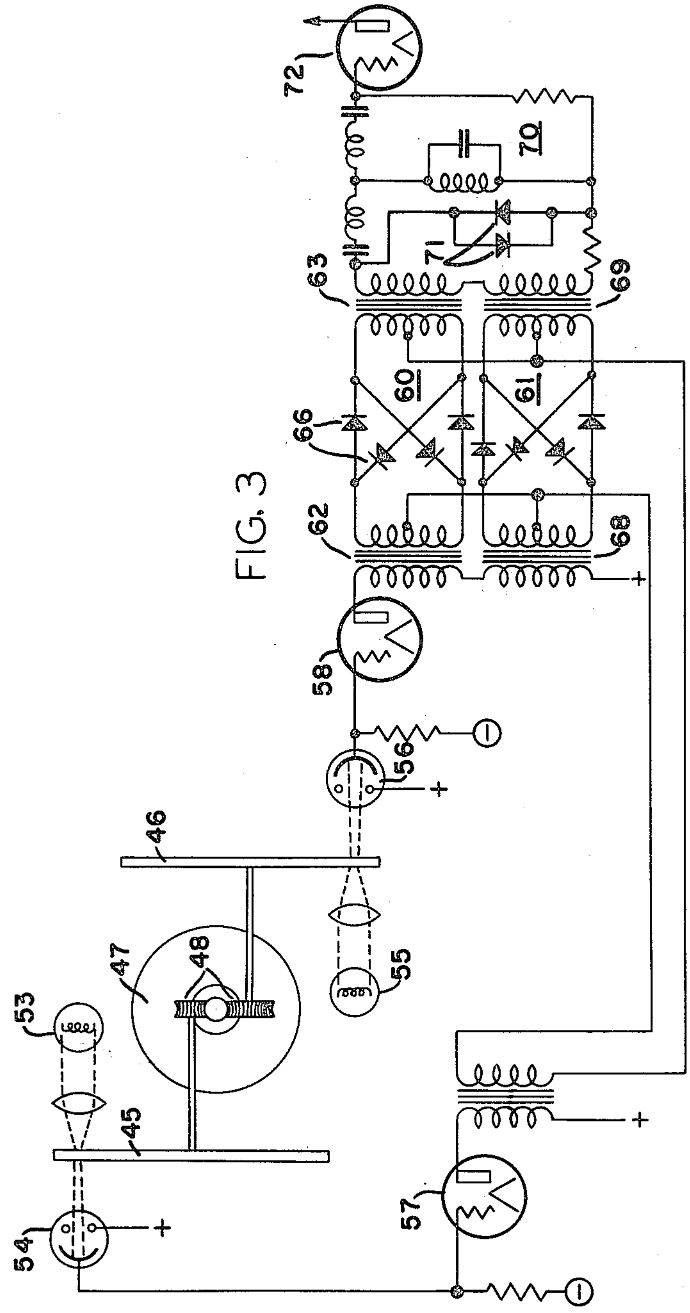
Fig. 3 illustrates another form of variable-frequency generator that may be used in connection with the system shown in Fig. 1.
Figure 4:
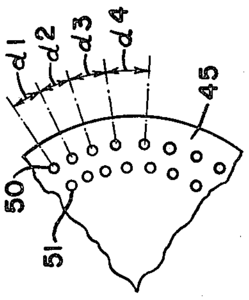
Fig. 4 is a fragmentary detail view of one of the chopper discs of Fig. 3.

An electro-optical generator of this type is illustrated in Figs. 3 and 4. In the embodiment shown by way of illustration, two chopper wheels 45 and 46 are shown, but any desired number may be used, as will be explained. Discs 45 and 46 are driven by a constant-speed motor 47, for example, at different rates through the gearing 48. Each of the chopper discs 45 and 46 is provided with a plurality of teeth or apertures of variable spacing arranged around the periphery of the disc. Two or more rows of apertures may be provided as indicated at 50 and 51 in Fig. 4, and the light source and photocell moved to a position where one or the other row of apertures is used, as desired. The distance between adjacent apertures in any particular row is varied so that as the disc is turned at a uniform speed, the time interval between the impulses generated by the associated photo-electric means will gradually increase and decrease. Thus, as shown in Fig. 4, the distance or spacing between the successive apertures in the row 50 varies from $d1$ to $d4$ in successively increasing steps or increments. It will be apparent that the rate of change of the spacing between the apertures is related to the rate of change in the speed of the motor driven by the optical generator.

The variably spaced apertures are laid out in accordance with a prearranged plan in order to obtain the desired speed variation. A master plate may be prepared by precision methods and employed to make any number of duplicate plates, one of which is used at the transmitting station and one at each receiving station. A separate and distinct aperture spacing plan or layout is preferably used for each of the rows of apertures on the different plates 45 and 46, and any other plates that may be employed.

As shown in Fig. 3, the chopper disc 45 is interposed between a light source 53 and a photocell 54 so that an uninterrupted train of frequency-modulated electrical impulses is generated in the output circuit of the photocell as the disc rotates. The photocell 54 is connected to the input circuit of an amplifier 57. Similarly the photocell 56 associated with the second chopper disc 46 and light source 55 is connected to the input circuit of an amplifier 58.

In order to obtain a control current of varying frequency from the current-impulse trains generated by the chopper discs 45 and 46, the output circuits of the amplifiers 57 and 58 are combined in a mixer or modulator circuit 60. The modulator circuit 60 comprises input and output transformers 62 and 63 respectively, the amplifier 58 being connected to the primary winding of the transformer 62, and the output of the amplifier 57 being connected to the centertap of the respective windings of the transformers 62 and 63 as shown. The modulator circuit 60 further comprises four selenium rectifiers 66, which are poled, as well known in the art, to prevent interaction between the two input circuits from the amplifiers 57 and 58. In this manner, the impulse frequencies are combined and the sum appears in the secondary winding of the transformer 63. The average frequencies generated by the discs 45 and 46 may be 50 and 100 cycles per second respectively, in which case a signaling current having an average frequency of 150 cycles per second may be derived from the modulator 60.

If desired, a second modulator 61 may be connected in parallel with the modulator 60, as shown, through transformers 68 and 69. The modulator 61 is similar to the modulator 60, but the primary winding of the transformer 68 is reversed so that the phase of the E. M. F. induced in the secondary winding of the transformer 68 is opposite that of the transformer 62. The secondary windings of the transformers 63 and 69 are connected in such a manner that the output currents of each modulator are added together. The total output current of the modulator is impressed upon a band-pass filter 70 which is adjusted to pass the band between 130 and 150 cycles. The filtering and shaping circuit is conventional except for a voltage limiter consisting of two oppositely poled current limiting elements 71, such as selenium rectifiers which have the property of high resistance at low values of voltage and rapidly decreasing resistance as the voltage is increased. This characteristic of the voltage limiting elements 71 cuts off the peaks of the signal waves and stabilizes the level of the output signal. The variable-frequency output current is amplified by an amplifier 72 and used to energize or control the driving motor of the facsimile set.

Figure 5:
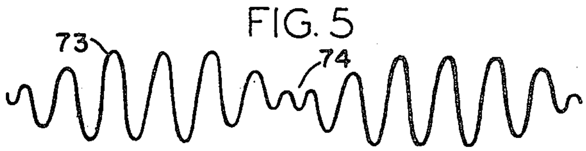
Figs. 5, 6 and 7 are graphs of the output signals obtained under certain conditions with the apparatus of Fig. 3.
Figure 6:
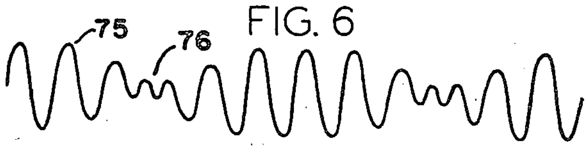
Figure 7:
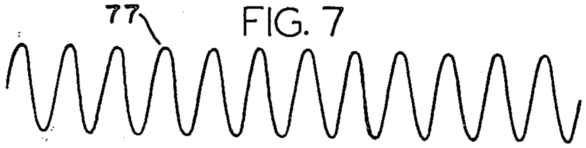

Phase shift effects in the modulating system can be kept to a minimum by limiting the voltages of both frequencies to about 0.2 volt. If the voltage applied to the rectifier elements of the modulator 60 is high the variable currents from the photocells 54 and 56 may cancel each other when a certain phase relation exists between them. In this case, the output voltage of the transformer 63 will vary between minimum and maximum values as indicated by the graph 73 in Fig. 5, the minimum value occurring at the point 74. Likewise the terminal voltage across the transformer 69 will vary at the same time as indicated by the graph 75 in Fig. 6, diminishing at times to a low value as indicated at the point 76. Since it is desirable to maintain the output current at a substantially constant level, the two modulators 60 and 61 are connected in parallel as shown and arranged so that the voltages across both transformers 63 and 69 are added. This results in a substantially uniform-level signaling current of varying frequency as indicated by the curve 77 in Fig. 7.

Ordinarily more than two chopper discs would be employed in order to obtain a wider variation in the impulse rate and render the repetition of the distortion pattern less frequent. The output currents from each additional chopper wheel would be combined with the variable frequency current produced by the output amplifier 72 in the same manner as the output of the two photocells 54 and 56 are combined in the modulators 60 and 61. In this manner, a variable-frequency current having an average value of 200 cycles or greater may be obtained and utilized for driving a synchronous motor of a facsimile transmitter, and an identical current derived from a second generator for controlling the recorder.

Figures 8, 9:
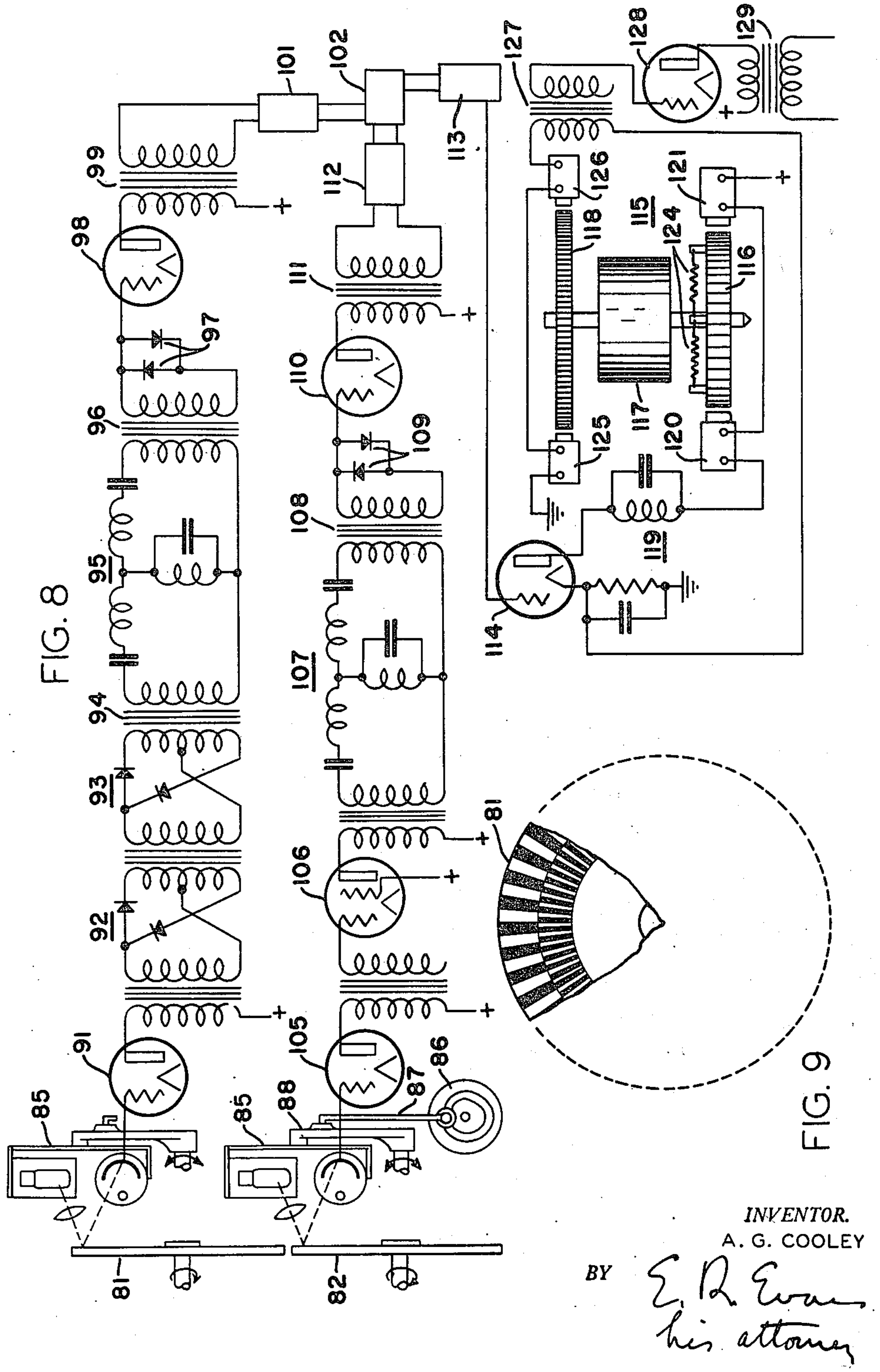
Fig. 8 illustrates a further modification.
Fig. 9 is a detail view of the optical disc used in the system shown in Fig. 8.

If desired, the variable-frequency output current from each chopper wheel-photocell unit may be doubled before it is mixed with the current from another unit. This arrangement, which is illustrated in Fig. 8 has the advantage that the range of frequency variation is doubled and smaller discs may be used. In Fig. 8 two light-modulating discs 81 and 82 are shown although more could be employed if desired. These discs, instead of being toothed or perforated discs, are provided with alternately reflecting and non-reflecting segments, as shown in Fig. 9. These rows of segments may be of the same width or of varying widths. In the latter case, the modulating disc would be rotated at constant speed. However, as shown, the segments are all of the same width and the variation in impulse frequency is obtained by moving the light source and photocell around the axis of the rotating disc.

A frame 85, carrying the lamp-photocell unit is mounted in front of each of the discs 81, 82, etc. The frame 85 is pivoted on the axis of the shaft carrying the modulator disc and is oscillated back and forth by any suitable means such as by a cam 86 and link 87 pivoted at its upper end to a bar 88 carrying the frame 85. With this arrangement, it will be apparent that as the disc 81 or 82 rotates, the light reflected upon the photocell is interrupted by the non-reflecting segments of the disc and thereby an uninterrupted train of impulses is generated in the output circuit of the photocell. The oscillation of the frame 85 results in a cyclic variation of the impulse rate. The variable-frequency impulses from the photocell associated with the disc 81 are amplified in an amplifier 91 and impressed upon the frequency doubler 92. Thus, if the average frequency of the impulses in the output of the photocell is 50 cycles per second, the output of the frequency doubler 92 will be an average frequency of 100 cycles per second, varying in accordance with the variations in the original signal train. A second frequency doubler 93 may be provided to obtain an average frequency of 200 cycles per second. Each frequency doubler comprises two rectifier elements connected between input and output windings as shown to produce an alternating output voltage of double frequency. The rectifiers may be for example of the selenium type.

The output current from the frequency doubler 93 is impressed upon a transformer 94, the secondary winding of which is connected to a conventional filter 95 to reduce the harmonics. The output terminals of the filter 95 are connected through a transformer 96 and a voltage limiter circuit to the control grid of an amplifier 98. The limiter circuit may consist of two oppositely poled selenium rectifier elements 97, as shown. The amplified signals from the amplifier 98, through a transformer 99, are impressed upon a second filter 101, the output of which is connected to the mixer 102 where the signals are combined with those generated by the second photo-electric cell generator.

The signals generated by the rotation of the disc 82 may be doubled as described above, but as shown, a different method is employed. After amplification in the amplifier 105, the signals are impressed upon a second tube 106, which is arranged to accentuate the third harmonic of the fundamental frequency. For example, the tube 106 may be a screen grid tube which is operated as a class B amplifier. Thus, if the variable-frequency current generated by the photocell unit has an average frequency of 50 cycles per second, the output current of the amplifier 106 has a large third harmonic of an average frequency of 150 cycles per second. The third harmonic is passed through the filter 107 designed to pass the 150 cycle band, and through a transformer 108 and voltage limiter 109, are impressed upon the control grid of an amplifier 110. The amplified current of an average frequency of 150 cycles per second, through a transformer 111, is impressed upon a second filter 112. The output of the filter 112 is impressed upon the mixer 102 where it is combined with the 200-cycle current passing through the filter 101. The output of the mixer is filtered in the filter 113 and the 350-cycle component is amplified in an amplifier 114 and utilized to drive a stabilizer unit 115.

The purpose of this unit is to smooth out the occasional turbulent variations of frequency which are of such magnitude that they might cause the synchronous driving motor of the facsimile equipment to drop out of step. The stabilizer unit is a motor-generator comprising a driving rotor 116, a flywheel 117 and a generator rotor 118 mounted for rotation on a single shaft. If additional discs similar to the discs 81 and 82 are employed, the output currents of the associated photocells are combined in the same manner as those shown and the current impressed upon the amplifier 114.

The output current from the amplifier 114 traverses a parallel resonant circuit 119 in series relation with the field magnet windings 120 and 121 of the stabilizer motor. The motor rotor is shown as connected to the shaft through coupling springs 124, as more fully disclosed in my prior patent, No. 2,276,936 above referred to, which discloses the detailed construction of the motor shown as a part of the stabilizer unit. The motor circuit is disclosed and claimed in my prior patent, No. 2,257,158, dated September 30, 1941.

The toothed rotor 118, together with the field poles carrying windings 125 and 126, forms an inductor alternator for generating a current, the frequency of which is controlled by the rotative speed of the motor rotor 116. The frequency of the current may differ from that impressed upon the motor, being determined by the number of poles or teeth on the rotor 118, and thus the stabilizer unit also serves as a frequency changer. The flywheel 117, having considerable inertia, serves to smooth out too rapid variations in the signal current from the amplifier 114 and, in the case of an occasional pulse of small amplitude from the mixer, maintains the rotation of the rotor 118. Thus the pulses from the alternator are nearly of uniform amplitude although their frequency changes in accordance with the variations produced by the electro-optical elements including discs 81 and 82 because the driving motor follows such variations.

The output current from the stabilizer unit 115 may be utilized to drive the motor of a facsimile set in a secret signaling system, as shown in Fig. 1, or for other purposes. The current may be amplified, if desired; the alternator windings are shown as connected through a transformer 127 to an amplifier 128 ahead of the output transformer 129. The secondary winding of the transformer 129 is connected to the driving motor 15 or 15A, or other apparatus adapted to be controlled by a variable-frequency current.

It will be apparent that the electro-optical generator constructed in accordance with the invention, possesses novel and useful properties. The generator makes possible greatly improved results in secret signaling systems, such as facsimile or telephoto systems. The mechanical complexity of the system is reduced to a minimum, thus greatly decreasing the undesirable distortion as distinguished from the planned distortion which the receiver is designed to eliminate. It will be understood that the invention resides primarily in a method and means for generating a variable-frequency current to produce a distorted train of signals or impulses, varying precisely in a predetermined manner, and to a secrecy system utilizing such distorted signals. Certain terms or phrases have been used herein because their usual meanings aptly describe the apparatus described. It is not intended that these words or phrases be interpreted in a restricted sense where to do so would unduly restrict the scope of the invention. The term "synchronous motor" means an alternating-current motor, the rotative speed of which is determined under all operating conditions by the frequency of the supply current and varies in accordance with fluctuations thereof. The phrase "chopper wheel" or "chopper disc" as used in connection with Fig. 3 is intended to include the use of the light-modulating discs of Figs. 2 and 8 since it will be obvious that discs or chopper wheels of the different types illustrated all serve the same purpose and are interchangeable.

Various modifications of the embodiments disclosed will occur to those skilled in the art and may be made without departing from the scope of the invention.

I claim:

1. In a facsimile system for secret communication, in combination, a transmitter provided with a rotatable drum for supporting the copy or picture to be transmitted, a synchronous motor for driving said drum, scanning means associated with said drum, a variable-frequency generator of the light-chopper type connected to said motor to vary the rotative speed of the drum and thereby distort the signal output of the transmitter as compared to a transmitter arranged to scan the copy at a uniform rate, said generator comprising a source of light, a photocell, a light chopper between said source and said photocell and means to vary the rate at which the light chopper interrupts the light on the photocell to cause an uninterrupted train of frequency-modulated impulses to be generated by the photocell, and a receiver provided with means including a second similar variable-frequency generator for correcting for the distortion of the signal output of the transmitter.

2. In a facsimile transmitter for secret communication, in combination, a rotatable drum for supporting the copy or picture to be transmitted, a synchronous motor for driving said drum, scanning means associated with said drum and electro-optical impulse generating means connected to said motor to operate the same at variable speed, said electro-optical generating means comprising a light chopper and photocell arranged to generate an uninterrupted train of substantially uniform impulses spaced at varying predetermined intervals.

3. In a facsimile receiver for a system of the character described employing signals generated by scanning the copy at a non-uniform rate, in combination, recording mechanism, a synchronous driving motor therefor and an electro-optical impulse generator connected to operate said motor, said impulse generator comprising a rotatable variable-spacing chopper wheel arranged to generate a continuous train of frequency-modulated impulses and thereby drive the motor at a variable rotative speed corresponding to the non-uniform rate of scanning the copy at the transmitter whereby the recording mechanism is controlled to correct the signal distortion.

4. A scanning arrangement for a facsimile system comprising, in combination, a rotatable scanning element, a synchronous motor for driving said rotatable element and an electro-optical impulse generator connected to said motor, said impulse generator comprising a photocell, a light chopper provided with a continuous series of apertures around the periphery thereof disposed in front of said photocell and means including said photocell and light chopper for generating an uninterrupted train of frequency-modulated impulses adapted to drive the motor continuously with predetermined fluctuations in speed and thereby vary the speed of the scanning element.

5. A scanning arrangement for a facsimile system comprising, in combination, a rotatable scanning element, a synchronous motor for driving said rotatable scanning element and a variable-frequency electro-optical generator connected to said motor to impart predetermined speed variations to said scanning element, said generator comprising a source of light, a photocell, a rotary chopper wheel interposed between said light and photocell and a plurality of cams arranged jointly to control the rotative speed of said chopper wheel.

6. A scanning arrangement for a facsimile system comprising, in combination, a scanning device, a member adjacent said scanning device for supporting the copy, synchronous motor means for producing relative movement between said scanning device and the copy, and a variable-frequency electro-optical impulse generator connected to said motor means to control the speed of the same, whereby to cause predetermined irregularities in the relative movement between the scanning device and the copy of relatively large magnitude, said impulse generator comprising a photocell, a light source for illuminating the cell and a rotatable chopper wheel disposed in front of said photocell to produce uninterrupted variable-rate impulse excitation of the photocell.

7. A scanning arrangement for a facsimile system comprising, in combination, a scanning device, a rotatable drum adjacent said scanning device for supporting the copy, a synchronous motor for driving the drum and a variable-frequency electro-optical impulse generator connected to said motor to control the rotative speed thereof, whereby to cause rotational variations in the movement of the drum of relatively large magnitude, said impulse generator comprising a photocell, a constant-speed chopper-wheel having a series of variably-spaced apertures around the periphery thereof and means including said photocell and chopper wheel to generate an uninterrupted train of variable-frequency current impulses.

8. In a facsimile system of the character described, a motor-driven transmitter of the drum type, a motor-driven recorder of the drum type, a transmission channel between said transmitter and said recorder, a variable-frequency alternating current generator having a frequency-modulated substantially symmetrical wave output connected to the driving motor of the transmitter and a second variable-frequency alternating current generator having the same output current characteristics connected to the driving motor of the recorder, each of said generators comprising impulse-generating means including a light-sensitive device and identical light choppers operatively associated therewith.

9. In a facsimile system of the character described, a motor-driven transmitter of the drum type, a motor-driven recorder of the drum type, a transmission channel between said transmitter and said recorder, a generator having a frequency-modulated substantially symmetrical wave output connected to the driving motor of the transmitter and a second substantially symmetrical wave generator having the same output current characteristics as the first-mentioned generator connected to the driving motor of the recorder, each of said generators comprising light-sensitive means, a plurality of chopper wheels for modulating the light impinging on said means, and means for combining the output currents from the respective chopper wheels.

10. In a facsimile system of the character described, a motor-driven transmitter of the drum type, a motor-driven recorder of the drum type, a transmission channel between said transmitter and said recorder, a generator having a frequency-modulated substantially symmetrical wave output connected to the driving motor of the transmitter and a second generator having the same output current characteristics as the first-mentioned generator connected to the driving motor of the recorder, each of said generators comprising a plurality of photocells, chopper wheels differing from each other, means including each photocell and its chopper wheel for generating current impulses, and means for combining the output currents of said photocells to obtain a current wave controlled by all of the chopper wheels.

AUSTIN G. COOLEY.

REFERENCES CITED

The following references are of record in the file of this patent:

UNITED STATES PATENTS

| Number | Name | Date |
|---|---|---|
| 1,164,015 | Randall | Dec. 14, 1915 |
| 1,475,583 | Hoxie | Nov. 27, 1923 |
| 1,648,687 | Hoxie | Nov. 8, 1927 |
| 1,727,194 | Belin | Sept. 3, 1929 |
| 1,885,728 | Keith | Nov. 1, 1932 |
| 1,910,540 | Hammond, Jr. | May 23, 1933 |
| 1,991,522 | Ranger | Feb. 19, 1935 |
| 2,015,742 | Cooley | Oct. 1, 1935 |
| 2,108,983 | Finch | Feb. 22, 1938 |
| 2,265,848 | Lewis | Dec. 9, 1941 |
| 2,401,402 | Bedford | June 4, 1946 |
| 2,402,067 | Mathes | June 11, 1946 |
| 2,406,811 | Deloraine | Sept. 3, 1946 |
| 2,415,591 | Hemoteau | Feb. 11, 1947 |
| 2,425,076 | Young | Aug. 5, 1947 |
| 2,425,616 | Hallborg | Aug. 12, 1947 |

OTHER REFERENCES

Electronics Magazine, April 1935, page 123.